United States Patent [19]

Nolting

[11] Patent Number: 4,682,536
[45] Date of Patent: Jul. 28, 1987

[54] ARRANGEMENT FOR DETERMINING AMBIENT TEMPERATURE IN A MOTOR VEHICLE

[75] Inventor: Peter Nolting, Buehlertal, Fed. Rep. of Germany

[73] Assignee: Robert Bosch GmbH, Stuttgart, Fed. Rep. of Germany

[21] Appl. No.: 825,243

[22] Filed: Feb. 3, 1986

[30] Foreign Application Priority Data

Feb. 13, 1985 [DE] Fed. Rep. of Germany ....... 3504842

[51] Int. Cl.⁴ .............................................. B60H 1/00
[52] U.S. Cl. ............................ 98/2.01; 236/DIG. 19; 374/138; 374/141
[58] Field of Search .................... 98/2, 2.01; 236/13, 236/DIG. 19; 374/138, 141

[56] References Cited

U.S. PATENT DOCUMENTS 3,738,572 6/1973 Hall, Jr. ................. 236/DIG. 19 X

FOREIGN PATENT DOCUMENTS 3109840 9/1982 Fed. Rep. of Germany ....... 98/2.01
52-47236 4/1977 Japan .......................... 236/DIG. 19

Primary Examiner—Harold Joyce
Attorney, Agent, or Firm—Michael J. Striker

[57] ABSTRACT

An air blower sucks air from an area of an air heated compartment of a motor vehicle and blows out an air stream into a different area of the compartment. A temperature sensor is located in the air stream at a relatively large distance from the air blower so as to entrain ambient air from the compartment. Due to the mixing of the discharged air stream with the ambient stream, an information about the overall temperature in the compartment is detected by a single temperature sensor.

13 Claims, 3 Drawing Figures

ARRANGEMENT FOR DETERMINING AMBIENT TEMPERATURE IN A MOTOR VEHICLE

BACKGROUND OF THE INVENTION

The present invention relates to an arrangement for detecting temperature in the compartment of a motor vehicle heated from a separate source of heated air regulated by a regulating device. Known are temperature determining arrangements in which temperature sensors are located in areas which are not exposed to heated air stream or are exposed to a forced air stream sucked in by means of suction blowers, discharge nozzles or under pressure suction pipes for air in a location in the compartment. A nonventilated sensor or a sensor ventilated by means of a locally sucked air have the disadvantage that the temperature regulation depends on air temperature in a too limited range of the inner space of the vehicle. A more effective regulation which would insure a greater comfort for passengers would require several temperature sensors distributed in the compartment. In addition, the distributed sensors would require a complicated housing provided with under pressure connections and the cost of such a complex arrangement would considerably increase.

SUMMARY OF THE INVENTION

It is therefore a general object of the present invention to overcome the disadvantages of prior art arrangements of this kind.

In particular it is an object of this invention to provide an improved arrangement which by means of a single temperature sensor and a single air blower permits the determination of ambient temperature in the entire compartment.

In keeping with this object and others which will become apparent hereafter, one feature of this invention resides in the provision of a suction blower whose suction inlet sucks air from the compartment at a location remote from an outlet of heated air discharged from the heated air source, the outlet of the blower discharging an air stream into the compartment to a location remote from the suction opening, and the temperature sensor being arranged in the air stream from the blower at a relatively large distance from the blower.

In this manner, ambient air in the compartment is admixed to the air stream from the blower and the temperature sensor delivers a correct information about temperature in the compartment which renders additional temperature sensors at other locations unnecessary.

Preferably, the air stream discharged from the blower is directed along a guiding surface such as a central console in the compartment or along an instrument panel, and the suction inlet of the blower is located preferably in the front foot area of the compartment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
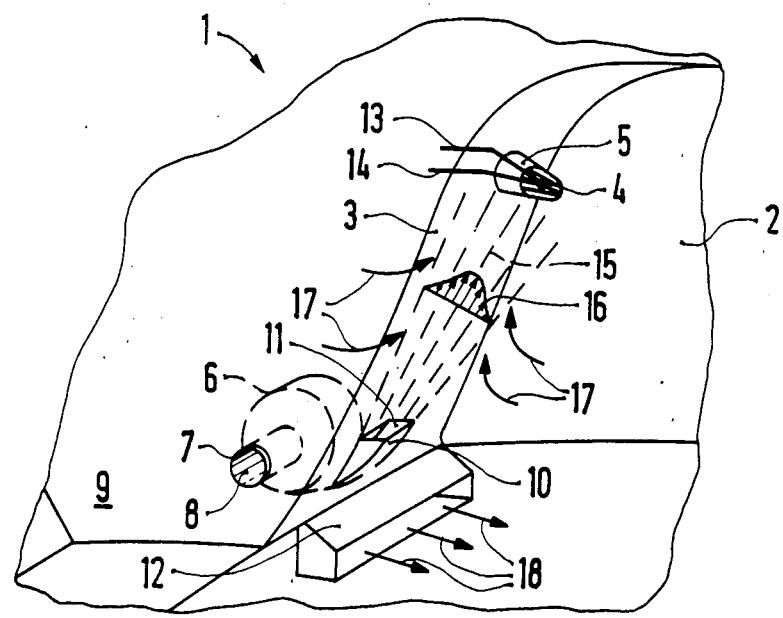
FIG. 1 is a perspective view of a cutaway part of a compartment of a motor vehicle provided with a first embodiment of the arrangement of this invention.

Referring firstly to FIG. 1, a motor vehicle 1 has a compartment 2 provided with a central console 3. A temperature sensor 4 is mounted on the upper part of the console 3. The sensor is accommodated in a housing 5 having a solid socket and a top provided with slots through which air flows and contacts the temperature sensor. An air blower 6 is arranged behind a lower part of the console 3. Its connection piece 7 provided with suction opening 8 is directed in the front left foot area 9 of the compartment 2. A discharge duct 10 is located above an inlet duct 12 through which a stream of heating air 18 is supplied from a separate source of heated air regulated by a nonillustrated regulating device. Accordingly, the discharge opening of duct 10 from blower 6 is directed in an inactive air zone taking place above the heating air duct 12 due to the discharged stream 18. Connection wires 13 and 14 of the temperature sensor 4 lead to the regulating device of a conventional construction. The velocity of air stream 15 from blower 6 is indicated on a diagram 16. Arrows 17 indicate the envelope of air stream 15 formed by ambient air in the compartment 2 which is entrained by the stream 15 and mixed with the same. The stream 18 of heated air from the duct 12 is directed in a different direction than the stream 15, as indicated by arrows.

In operation, blower 6 sucks air from the foot area 9 of the compartment and consequently the temperature of the discharged air stream 15 corresponds to that in the area 9. Due to the mixing action with the ambient air from the central region of the compartment 2, the temperature of the air stream 15 is correspondingly changed. Since the temperature sensor 4 is located a large distance from the discharge opening 11 and from the outlet of the heating air duct 12, the detected temperature represents an approximation of the overall temperature in the compartment.

Figure 2:
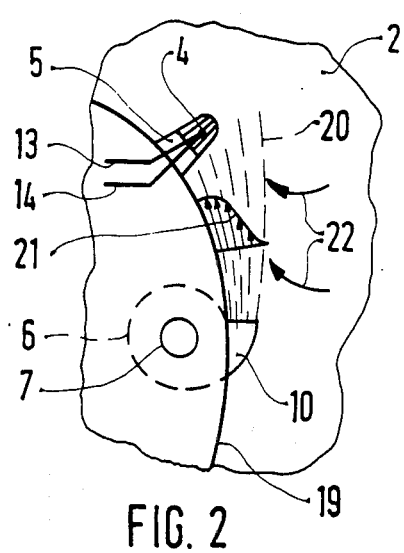
FIG. 2 is a simplified side view of a second embodiment of this invention.

In the embodiment of FIG. 2, the same air blower 6 is situated inside an instrument panel 19. The instrument panel has a curved upper surface which is convex relative to the compartment 2. The discharge duct 10 from the blower 6 projects into the compartment and is directed upwards to blow an air stream 20 along the curved upper surface of the panel 19. Due to physical laws governing the fluid flow along curved surfaces, the air velocity distribution is modified as indicated by arrows in the diagram 21. Ambient air from the compartment 2 which is admixed into the air stream 20 is indicated by arrows 22. The temperature sensor 4 is mounted on the instrument panel in the path of the air stream 20 at a relatively large distance from the discharge duct 10. The housing 5 of the temperature sensor is of the same design as in the preceding embodiment. The connection piece 7 at the suction side of the blower 6 can be used for the attachment of a nonillustrated hose whose inlet opening can be placed at an arbitrary location in the compartment 2. Preferably, the intake location for the measured air is below the blower 6. The operation of the second embodiment is the same as in the arrangement of FIG. 1 except a different air mixing effect caused by the flow of the air stream 20 along the curved surface of panel 19.

Figure 3:
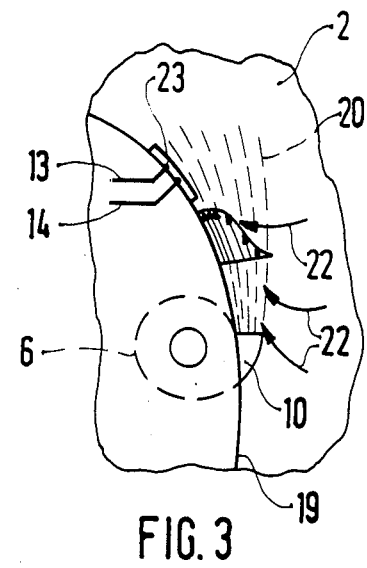
FIG. 3 is a simplified side view of a third embodiment.

The embodiment of FIG. 3 corresponds in principle to that in FIG. 2 with the exception that instead of a temperature sensor 4 which is situated above the curved surface of instrument panel 9, a flat temperature sensor 23 is employed. With advantage, the flat sensor 23 is supported on a self-sticking flexible tape. It is also possible to arrange the temperature sensor 23 in the interior of the instrument panel 19 so as to contact a thin heat conducting upper layer of the instrument panel 19. In this case, the sensor detects the temperature of the outer layer upon heating by the stream 20 of the mixed air.

While the invention has been illustrated and described as embodied in specific examples of the temperature detecting arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for determining ambient temperature in a compartment of a motor vehicle including a regulated source of heated air, the source communicating with the compartment through a first duct, comprising an air blower for sucking air from the compartment at a location remote from said first duct and blowing an air stream into the compartment through a second duct, and a temperature sensor arranged in said air stream at a relatively large distance from said first and second ducts.

2. An arrangement as defined in claim 1, wherein said air stream from the blower is freely discharged into the compartment against said temperature sensor.

3. An arrangement as defined in claim 1, wherein said air stream from the blower is discharged along a curved surface in said compartment to flow past said temperature sensor.

4. An arrangement as defined in claim 1, wherein said temperature sensor is located in a housing provided with throughflow openings.

5. An arrangement as defined in claim 1, wherein the temperature sensor is mounted on a flexible support provided with a self-sticking surface.

6. An arrangement as defined in claim 1, wherein said blower is arranged separately from said compartment and is protected against ambient temperature.

7. An arrangement as defined in claim 6, wherein said blower is located inside a central console of said compartment.

8. An arrangement as defined in claim 6, wherein said blower is located behind an instrument panel.

9. An arrangement as defined in claim 6, wherein a suction opening of said blower communicates with a front foot area of said compartment.

10. An arrangement as defined in claim 1, wherein said discharge opening of said second duct is directed in an inactive air zone located above said first duct.

11. An arrangement as defined in claim 1, wherein said air blower and said temperature sensor are mounted on a common plate.

12. An arrangement as defined in claim 1, wherein said blower and said temperature sensor are mounted separately one from the other.

13. An arrangement as defined in claim 8, wherein said temperature sensor is mounted on the inner side of said instrument panel in contact with a thin heat conducting upper layer of the panel exposed to the air stream from said second duct.

* * * * *